US 6,745,674 B2

(12) United States Patent
Sioutis et al.

(10) Patent No.: US 6,745,674 B2
(45) Date of Patent: Jun. 8, 2004

(54) TOPPING TEMPLATE FOR HANDMADE PAN PIZZAS

(76) Inventors: Nicholas Sioutis, 19 Brookmawr Rd., Newtown Sq., PA (US) 19073; Anastasi Sioutis, 106 Lincoln Cir., Broomall, PA (US) 19008

( * ) Notice: Subject to any disclaimer, the term of this patent is extended or adjusted under 35 U.S.C. 154(b) by 79 days.

(21) Appl. No.: 10/200,272

(22) Filed: Jul. 22, 2002

(65) Prior Publication Data

US 2004/0011219 A1 Jan. 22, 2004

(51) Int. Cl.[7] ............................. A47J 43/18; A01J 27/02
(52) U.S. Cl. .................. 99/433; 99/450.1; 99/DIG. 15; 118/13
(58) Field of Search ........................ 99/450.1, DIG. 15, 99/645, 432, 433; 425/412, 398, 406; 249/149, 187.1, 100, 101, 144; 118/13

(56) References Cited

U.S. PATENT DOCUMENTS

| 3,166,027 A | | 1/1965 | Sprenzel |
| 3,322,074 A | | 5/1967 | Malnory |
| 3,431,836 A | * | 3/1969 | Murrell ........................ 99/433 |
| 3,864,071 A | | 2/1975 | La Monica |
| 4,131,080 A | * | 12/1978 | Hughes ........................ 118/13 |
| 4,417,867 A | | 11/1983 | Bauer |
| 4,511,324 A | | 4/1985 | Bauer |
| 4,911,634 A | * | 3/1990 | Keener ........................ 425/412 |
| 5,109,760 A | | 5/1992 | Ansari |
| 5,117,749 A | | 6/1992 | Bakker |
| 5,243,899 A | | 9/1993 | Moshier et al. |
| 5,256,432 A | | 10/1993 | McDonald et al. |
| 5,508,049 A | | 4/1996 | Kordic |
| 5,789,009 A | | 8/1998 | Kordic et al. |
| 5,806,411 A | * | 9/1998 | Howle ........................ 99/433 |
| 6,026,737 A | | 2/2000 | D'Alterio et al. |

* cited by examiner

Primary Examiner—Reginald L. Alexander
(74) Attorney, Agent, or Firm—Michael G. Crilly, Esq.

(57) ABSTRACT

The present invention is a device facilitating both rapid and efficient assembly of handmade pizzas. The invention consists of a ring placed within a pan over a pizza shell thereby restricting toppings to the central region of a pizza. In one embodiment, the circular ring has a solid structure. In preferred embodiments, the circular ring is hollowed thereby reducing weight and facilitating space efficient stacking of two or more rings. Exemplary sectional structures include square, rectangle, trapezoid, and trapezoid-like shapes. In yet other embodiments, one or more grips are provided facilitating placement and removal of ring from pan.

7 Claims, 4 Drawing Sheets

TOPPING TEMPLATE FOR HANDMADE PAN PIZZAS

CROSS REFERENCE TO RELATED APPLICATIONS

None.

FEDERALLY SPONSORED RESEARCH OR DEVELOPMENT

None.

BACKGROUND OF THE INVENTION

1. Field of the Invention

The present invention generally relates to a topping template for the assembly of handmade pizzas. Specifically, the invention is a ring-shaped device placed over pizza dough within a pan prior to the application of toppings. The invention limits toppings to the center of a pizza.

2. Background

The assembly of ingredients, namely toppings and dough, to form a complete pizza is a labor-intensive activity having a direct impact on product cost. For example, handmade pan pizzas are assembled by placing dough within a pan and thereafter manually depositing sauces, cheeses, vegetables, meats, and other toppings onto the dough. The assembler manually separates toppings from the outer edge of crust and pizza pan to avoid scorching of toppings during baking and to provide a clearly defined crust. This operation alone is both tedious and time intensive.

The related arts have sought to reduce assembly time via devices and methods for the mechanical shaping of dough, the mechanical application of cheese, and the automated assembly of pizzas or components thereof.

For example, Ansari, U.S. Pat. No. 5,109,760 issued May 5, 1992, describes and claims an apparatus mechanizing separation and distribution of cheese onto a pizza shell. The apparatus includes separator screen and cheese dispenser within a tube. The apparatus is centered over pizza shell and mechanically operated by the assembler.

In another example, Moshier, U.S. Pat. No. 5,243,899 issued Sep. 14, 1993, describes and claims an apparatus for the automated assembly of a solid, toppings disk placed within an uncooked dough shell immediately prior to baking. The invention includes a conveyor means for transporting a plurality of forming surfaces, a depositing means for applying cheese and other toppings onto said forming surfaces, and a fusing means to form cheese/topping disks. A plurality of templates are provided along a conveyor means to direct toppings dispensed from a hopper onto a forming surface traveling along a second conveyor means below each template. The template described by Moshier facilitates the assembly of circular topping disks separate and apart from an uncooked pizza shell.

The complexity and cost of the related arts frustrate the effective exploitation of such devices by small, independent pizza makers or by workers assembling pizzas manually. Furthermore, many inventions are not compatible with traditional, pizza-making methods developed by multi-generational pizza makers. A consequence of the related arts is homogenization of the final product and loss of distinctive flavors and appearance.

What is required is a simple, lightweight, durable, cost-efficient and self-centering device facilitating the time efficient assembly of toppings onto a handmade pan pizza. What is required is a device preventing contact between toppings and pan during assembly thereby avoiding damage to toppings during baking and enabling a worker to more quickly assemble a pizza. What is required is a mechanically simple device that produces a more visually appealing final product.

SUMMARY OF THE INVENTION

An object of the present invention is to provide a simple, lightweight, durable, and self-centering device facilitating the time-efficient assembly of toppings onto the dough of a handmade pan pizza.

Another object of the present invention is a device that prevents contact between toppings and pan during assembly.

A further object of the present invention is to provide a mechanically simple device producing a more visually appealing pizza.

The present invention is comprised of a ring-shaped element. The outer diameter of the invention is slightly smaller than the inner diameter of a typical pizza pan thereby facilitating the centered placement of ring within pan over an uncooked shell and preventing toppings from inadvertently accumulating between pan and ring. The inner diameter of the device is sufficiently large to allow for the deposition of toppings across a majority of the shell. Ring thickness insures one end of the device is either flush with or extends above the pan. Contact between invention and dough within a pan prevents accumulation of liquid and solid toppings along the crust portion of the final product.

Various shapes are possible along the cross section of the ring structure. In one embodiment, the ring structure is composed of a solid mass. In preferred embodiments, the ring structure is hollowed thereby reducing weight and facilitating the space-efficient stacking of two or more rings. Exemplary section structures include but are not limited to square, rectangle, and other trapezoid shapes. Preferred embodiments are four-sided wherein the end closest to assembler is angled downward towards the pizza shell thereby directing toppings onto the dough. In yet other embodiments, one or more grips are provided facilitating placement of ring over pizza shell within a pan. The invention is composed of a polymer, corrosion resistant metal, or metal with non-stick surface.

Several advantages are offered by the present invention. The invention reduces assembly time for a typical 12-inch pan pizza by 20 to 30 seconds. The invention provides for the more efficient use of toppings without adversely affecting appearance of the final product. The invention provides a more visually appealing product by insuring a toppings-free crust surrounded by a circular area of toppings.

BRIEF DESCRIPTION OF THE DRAWINGS

The invention will now be described in more detail, by way of example only, with reference to the accompanying drawings, in which.

REFERENCE NUMERALS

Figure 1:
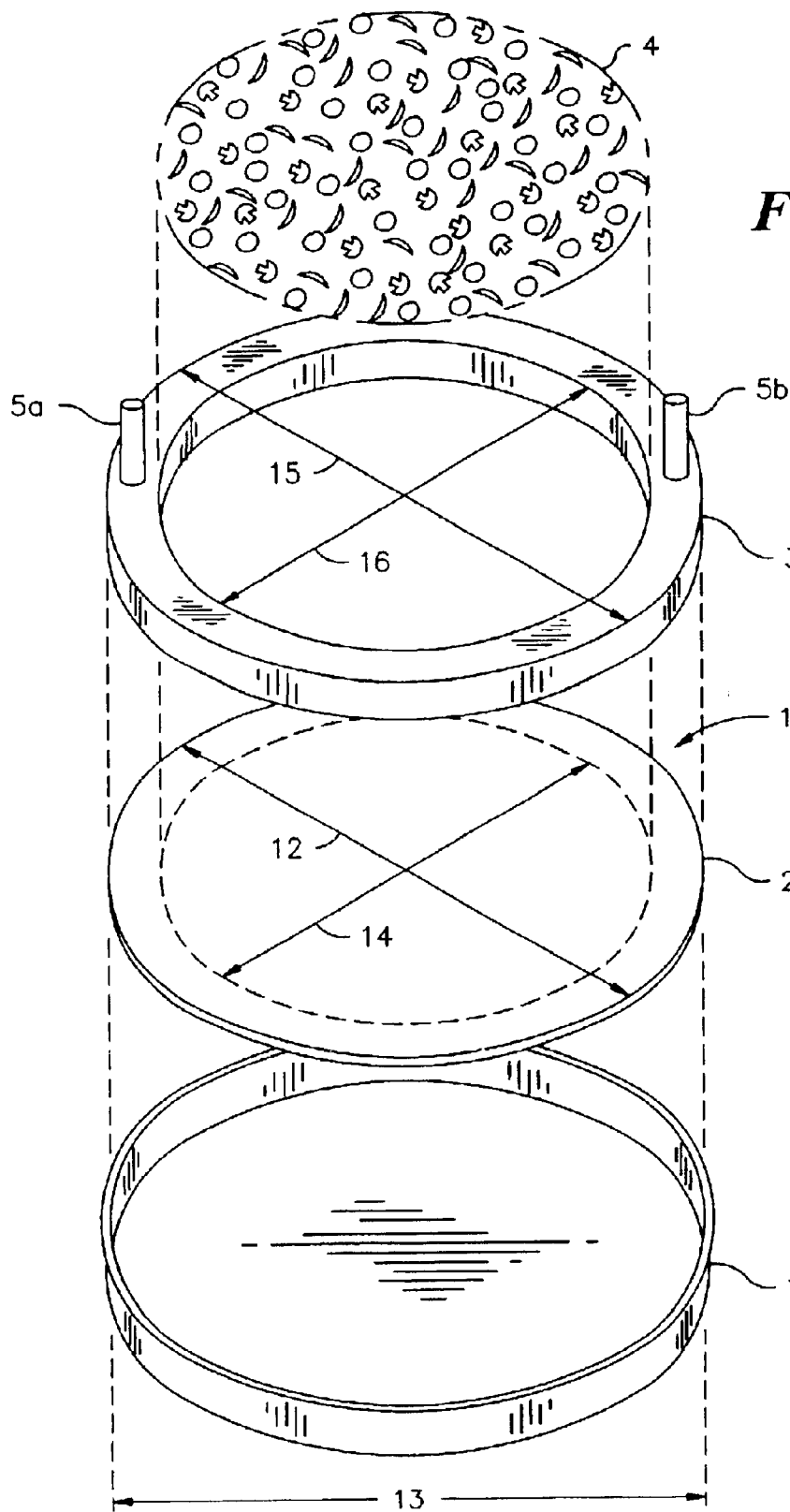
FIG. 1 is an exploded view illustrating present invention with pan, pizza shell, and toppings.

1 Pan
2 Pizza shell
3 Template
4 Toppings
5 Grip
6 Liquid topping
7 Solid topping
8 Inner surface
9 Outer surface
11 Crust region
12 Toppings region
13 Inner diameter
14 Outer diameter
15 Outer diameter
16 Inner diameter
17 Width
18 Flange
19 Height
20 Pan wall
21 Top surface
22 Bottom surface
24 Gap

DESCRIPTION OF THE INVENTION

FIG. 1 shows an exploded view of the present invention, identified as a template 3, with respect to toppings 4, pizza shell 2, and pan 1. A pizza shell 2 having an outer diameter 14 slightly less than the inner diameter 13 of the pan 1 is positioned within the pan 1 so to support the pizza shell 2 in a horizontal fashion. A template 3 having an outer diameter 15 slightly less than the inner diameter 13 of the pan 1 is placed over the pizza shell 2 thereby covering the pizza shell 2 along the area forming the crust region 11 after baking. Thereafter, toppings 4 are applied onto the pizza shell 2 so to cover the pizza shell 2 bounded by the crust region 11 and referred to as the toppings region 12. The area encompassing the toppings region 12 is approximately equal to that provided by the inner diameter 16 of the template 3.

Figure 2:
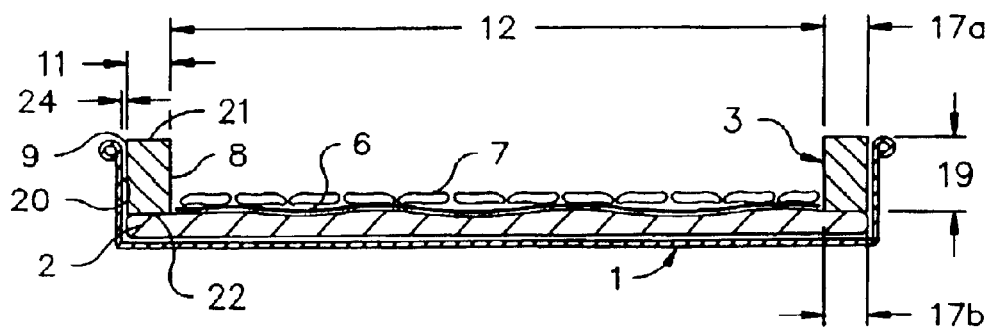
FIG. 2 is a section view of template illustrating embodiment wherein ring structure has a rectangular section.

The template 3 is composed of a ring-shaped element having a top surface 21, a bottom surface 22, an inner surface 8, and an outer surface 9, as shown in FIG. 2.

The top surface 21 is horizontally disposed with respect to and parallel with the bottom surface 22. The top surface 21 prevents toppings 4 from contacting the crust region 11 of the pizza shell 2 and from accumulating between template 3 and pan 1 during assembly of toppings 4 onto the pizza shell 2. The bottom surface 22 contacts the pizza shell 2 along the crust region 11. The template 3 is of sufficient mass to exert a downward force onto the pizza shell 2 to form a seal between pizza shell 2 and template 3 thereby containing liquid toppings 6 and solid toppings 7 within the toppings region 12.

Referring now to FIG. 2, the width 17a of top surface 21 should be approximately equal to the width 17b of the bottom surface 22. However in preferred embodiments, a top surface 21 of smaller width 17a than the width 17b of the bottom surface 22 provides a tapered profile along the outer surface 9 thereby easing insertion of template 3 into pan 1 and a tapered profile along the inner surface 8 thereby directing toppings 4 contacting the template 3 onto the pizza shell 2. The height 19 of the template 3 should be sufficient so that a portion of the top surface 21 is either flush with or extends above the pan 1, as shown in FIG. 3

Outer surface 9 and inner surface 8 are concentrically centered circular elements wherein the outer surface 9 is of larger diameter than the inner surface 8. The outer surface 9 has a slightly smaller outer diameter 15 than the inner diameter 13 of the pan 1. Contact between template 3 and pan 1 along the outer surface 9 centers template 3 over the uncooked pizza shell 2, as shown in FIG. 2. Again referring to FIG. 2, the gap 24 between template 3 and pan wall 20 should be no larger than the smallest solid topping 7 to prevent toppings 4 from lodging between pan 1 and template 3. The inner diameter 16 of the template 3 determines the total area occupied by the toppings region 12 along the pizza shell 2.

Various solid and hollowed sectional shapes are possible along the structure of the template 3. Template 3 structures include but are not limited to square, rectangle, and trapezoid shapes.

Figure 3:
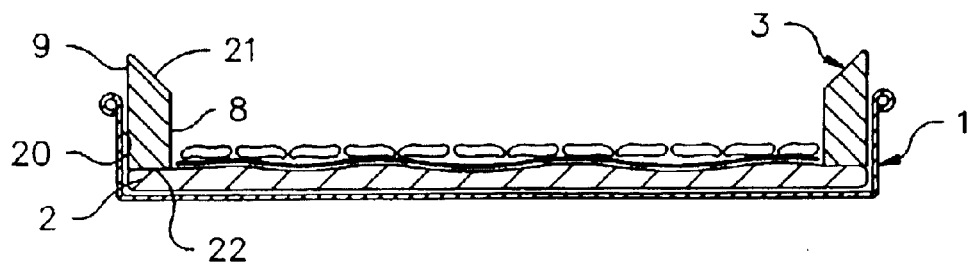
FIG. 3 is a section view of template illustrating embodiment wherein ring structure has a solid cross section with inwardly angled first end.
Figure 4:
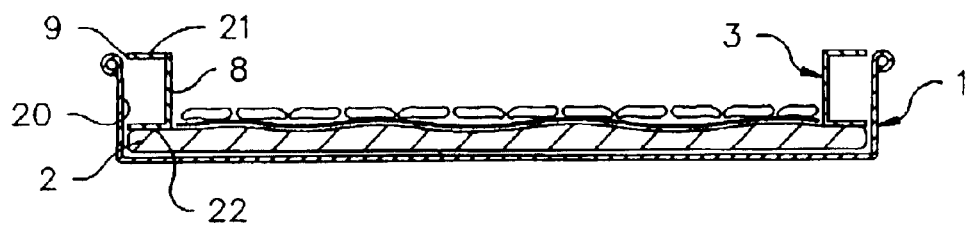
FIG. 4 is a section view of template illustrating embodiment wherein ring structure has a c-shaped section.
Figure 5:
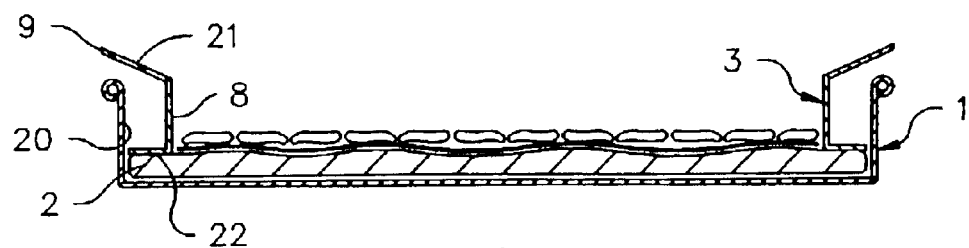
FIG. 5 is a section view of template illustrating embodiment wherein ring structure has a c-shaped section with inwardly angled first end.
Figure 6:
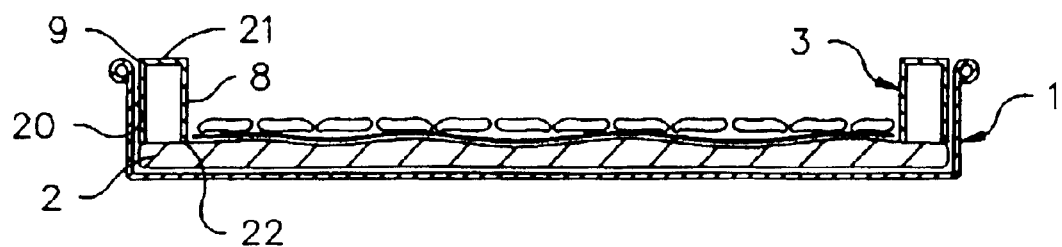
FIG. 6 is a section view of template illustrating an alternate embodiment wherein ring structure has a c-shaped section.
Figure 7:
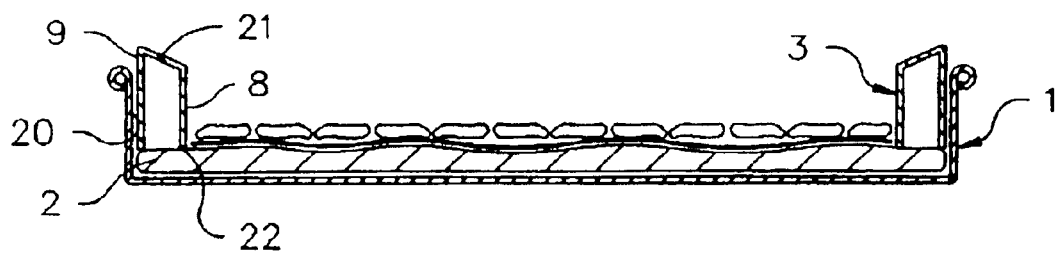
FIG. 7 is a section view of template illustrating an alternate embodiment wherein ring structure has a c-shaped section and inwardly angled first end.

Six exemplary cross sections are described in FIGS. 2–7. FIG. 2 shows a solid, rectangular-shaped structure. FIG. 3 shows a solid, four-side structure wherein the top surface 21 is angled downward from outer surface 9 to inner surface 8 thereby directing toppings 4 into the toppings region 12. FIG. 4 shows a c-shaped structure composed of parallel disposed top surface 21 and bottom surface 22 attached at a right angle to a circular inner surface 8 and having a bifurcated outer surface 9. FIG. 5 shows an alternate embodiment to the device in FIG. 4 wherein the top surface 21 is angled to direct toppings 4 onto the pizza shell 2. In preferred embodiments, the angled top surface 21 in FIG. 5 extends beyond the pan wall 20. FIG. 6 shows a c-shaped structure composed of inner surface 8 and outer surface 9 in a parallel arrangement attached at a right angle to a centrally located top surface 21 and having a bifurcated bottom surface 22. FIG. 7 shows an alternate embodiment for device in FIG. 6 wherein top surface 21 is angled to direct toppings 4 onto the pizza shell 2.

Hollowed embodiments, as shown in FIGS. 4–7, minimize template 3 weight and reduce material and fabrication costs. The c-shaped embodiments in FIGS. 6 and 7 facilitate the space-efficient stacking of two or more templates 3 where outer surface 9 and inner surface 8 are angled slightly outward to form a trapezoid or trapezoid-like shape.

Figure 8:
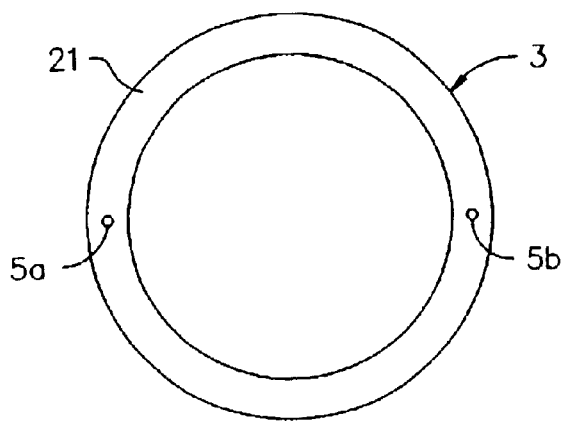
FIG. 8 is a top view of template with pair of cylindrical-shaped grips.
Figure 9:
FIG. 9 is a side elevation view of template showing cylindrical-shaped grips attached to template within a pan.
Figure 10:
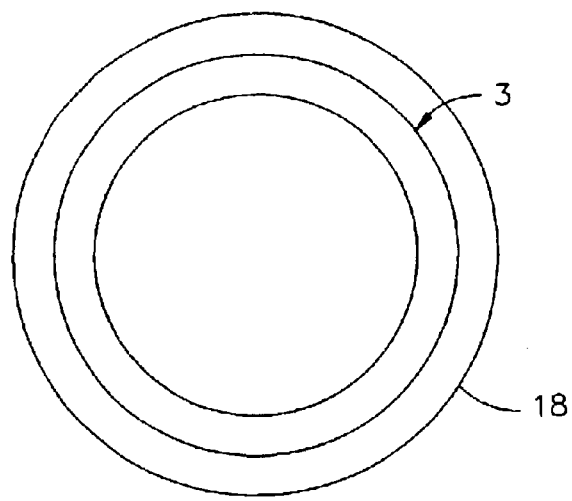
FIG. 10 is a top view of template with circular flange.
Figure 11:
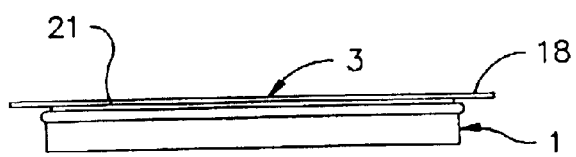
FIG. 11 is a side elevation view of template showing circular, flange attached to template within a pan.

In alternate embodiments, one or more grips 5 or flanges 18 are provided for placement of template 3 over pizza shell 2 within a pan 1. FIGS. 8 and 9 describe two cylindrical-shaped grips 5a, 5b attached and perpendicular to the top surface 21 of a template 3. FIGS. 10 and 11 describe a single grip 5 comprised of a circular-shaped flange 18 attached at a right angle to the template 3 and projecting above the pan wall 20. However, flange 18 may be comprised of an angled top surface 21, as shown in FIG. 5. Grips 5 and flanges 18 are attached via adhesive or mechanical means or molded directly onto the template 3 during fabrication.

Preferred embodiments of the template 3 are composed of a food-grade polymer, a corrosion resistant metal, or a metal with non-stick surface. Example food-grade polymers include but are not limited to polyethylene, polypropylene, polytetrafluorethylene (PTFE), and combinations thereof. Polymer-based templates 3 are fabricated using standard injection molding, extrusion molding, and machining techniques. Corrosion resistant metals include aluminum, chromium-plated steel, and stainless steel. Metal-based templates 3 are forged, machined, or mechanically shaped using techniques understood in the art. Non-stick coated materials include PTFE-coated aluminum, similar to those found in cookware.

The description above indicates that a great degree of flexibility is offered in terms of the template 3. Although the present invention has been described in considerable detail with reference to certain preferred versions thereof, other versions are possible. Therefore, the spirit and scope of the appended claims should not be limited to the description of the preferred versions contained herein.

What is claimed is:

1. A template for assembling toppings onto a pizza shell within a pan comprising a ring having a top surface, a bottom surface, an inner surface and an outer surface, said bottom surface having a width approximately equal to that of a crust about said pizza shell, said outer surface of slightly smaller diameter than that of said pan, said inner surface of smaller diameter than said outer surface, said outer surface and said inner surface concentrically disposed between said top surface and said bottom surface, said top surface angled downward towards said topping.

2. The template of claim 1, wherein said ring has a solid cross section bounded by said ton surface, said inner surface, said bottom surface, and said outer surface.

3. The template of claim 1, wherein said ring has a trapezoid-shaped cross section bounded by said ton surface, said bottom surface, said inner surface, and said outer surface, said inner surface parallel to said outer surface.

4. The template of claim 1, wherein said ring has a hollow cross section bounded by said ton surface, said bottom surface, said inner surface, and said outer surface.

5. The template of claim 1, wherein said ring has a c-shaped cross section bounded by said top surface said inner surface, and said bottom surface.

6. The template of claim 1, wherein said ring has a c-shaped cross section bounded by said inner surface, said top surface, and said outer surface.

7. The template as in any one of claim 1, 2, 3, 4, 5, or 6, further comprising at least one grip attached to said ring.

* * * * *